UNITED STATES PATENT OFFICE.

GEORGE D. COLEMAN, OF BOSTON, MASSACHUSETTS.

METHOD OF COATING IRREGULAR SURFACES.

SPECIFICATION forming part of Letters Patent No. 717,495, dated December 30, 1902.

Application filed May 7, 1902. Serial No. 106,363. (No specimens.)

*To all whom it may concern:*

Be it known that I, GEORGE D. COLEMAN, a citizen of the United States, residing at Boston, in the county of Suffolk and State of Massachusetts, have invented certain new and useful Improvements in Methods of Making Antifouling Coatings for Irregular Surfaces; and I do hereby declare the following to be a full, clear, and exact description of the invention, such as will enable others skilled in the art to which it appertains to make and use the same.

The present invention relates to an improved method of making antifouling coatings for irregular surfaces.

The object of my invention has been to devise and produce a method of applying an antifouling coating, such as the antifouling of Letters Patent granted to me July 25, 1899, No. 629,426, and September 17, 1901, Nos. 682,913 and 682,914, and other like or similar coatings to irregular surfaces, which because of the irregularity of their contour it would be difficult to hammer or burnish with ordinary implements for that purpose.

My invention is particularly useful in the application of antifouling coatings to bridge structures, and particularly such parts of such structures as after the structure is erected are not readily accessible for painting. In such cases the desired antifouling coating would be applied to the structure prior to or in the course of erection, which would thereby form a permanent and efficient protective coating.

According to my invention and describing it particularly in connection with the application of one of the simplest forms of many coatings which might be applied for this purpose, I first coat the structure or surface with a layer of paint, preferably a waterproof paint, made of the paint substance described in my copending application filed January 31, 1902, Serial No. 92,066, mixed with a varnish, preferably made of forty gallons of linseed-oil to one hundred pounds of zanzibar or kauri gum. The cement or paint substance above described may be shortly defined as consisting of a mixture of red lead or litharge and drying-oil chemically united by baking at a low temperature and having the property of uniting with oils or varnishes to form a dense, tough, highly-adhesive, water-resisting paint. After the structure or surface has been coated with this paint and before the paint has dried and while it is still moist or tacky I apply, by means of a blower or other suitable means, comminuted or finely-divided metal, such as copper or nickel, which comminuted or finely-divided metal adheres to the tacky surface of paint and forms a surface closely studded with bare particles of metal. This paint, with its adhering particles of comminuted or finely-divided metal, is now allowed to dry until the surface of the paint has become sufficiently dry to securely hold the particles of metal, but it is not allowed to dry until the entire body of paint becomes dry and hard—that is to say, this layer of paint, with its adhering layer of comminuted or finely-divided metal, is allowed to dry until the surface is dry, while the portion of the paint underneath the surface is still more or less moist and capable of flowing under pressure.

In the methods of making the various antifouling coatings described in the above-named patents the surface of the coating at some stage of its production was hammered or burnished to compact the particles of metal together and to rearrange the particles with relation to each other, so that they shall present a smooth surface to the action of the elements. In applying such coating to irregular surfaces any ordinary means of hammering or burnishing the surface cannot be employed, and the present invention therefore contemplates the employment of a blast of finely-divided material and which may consist of finely-divided wood, leather, leather-board, mica, or other suitable materials, whether of natural or artificial production. The hammering material will preferably consist of larger particles than the particles of comminuted copper. In the claim I have employed the expression "hammering material" to define the material which is employed to hammer and compact the surface of particles of copper, and by this expression I intend to limit my invention to the use of a material suitable for hammering and compacting the surface, thereby excluding abrasive or grinding materials and materials which would cut or remove the copper particles. This hammering material is projected, by means of an air or steam blast or other suitable means, against the surface studded with the particles of metal and which in case of the use of a blast will preferably be under a pressure of about half that used in applying the particles of comminuted metal. Thus where in applying the finely-divided metallic copper or nickel I employ an air-pressure of about forty pounds to the square inch I would employ a pressure of about twenty pounds to the square inch to drive the particles of hammering material against such surface. The action of the particles of hammering material upon the surface thus described, irrespective of the irregularities of the surface, results in rearranging the particles of comminuted metal with relation to each other, so that they present an exterior smooth surface, which is closely studded with bare particles of metal, thereby removing the inequalities and hammering or burnishing the surface of the layer to produce the desired smoothness of surface. It will be observed that this hammering process results in embedding still more firmly the particles of metal in the layer of paint, which being soft underneath the surface flows thereunder to permit the particles of metal to rearrange themselves therein.

While I have herein described the method of carrying out my process, which consists in applying a coating or paint to the irregular surface to be covered, in projecting thereagainst finely-divided metallic particles, and in hammering or burnishing this surface with a blast of fine particles of hammering material, it is to be understood that my present invention contemplates the application of the coatings of my hereinbefore-mentioned patents to irregular surfaces and that the gist of my invention consists in hammering or burnishing the irregular surface to be coated after the particles of finely-divided metal have been projected against the moist surface of paint thereon by means of a blast of finely-divided hammering material, rearranging the particles of metal with relation to each other, compacts them together, and produces a smooth surface closely studded with bare particles of metal, which will successfully and durably resist the action of the elements.

Having thus described my invention, I claim as new and desire to secure by Letters Patent of the United States—

The method of making antifouling coatings for irregular surfaces which consists in coating the surface to be covered with comminuted metal and in hammering the comminuted metal by a blast of hammering material, substantially as described.

In testimony whereof I affix my signature in presence of two witnesses.

GEORGE D. COLEMAN.

Witnesses:
HORACE VAN EVEREN,
FRED O. FISH.